L. F. ADT.
EYEGLASSES.
APPLICATION FILED MAY 3, 1907.
977,151.
Patented Nov. 29, 1910.
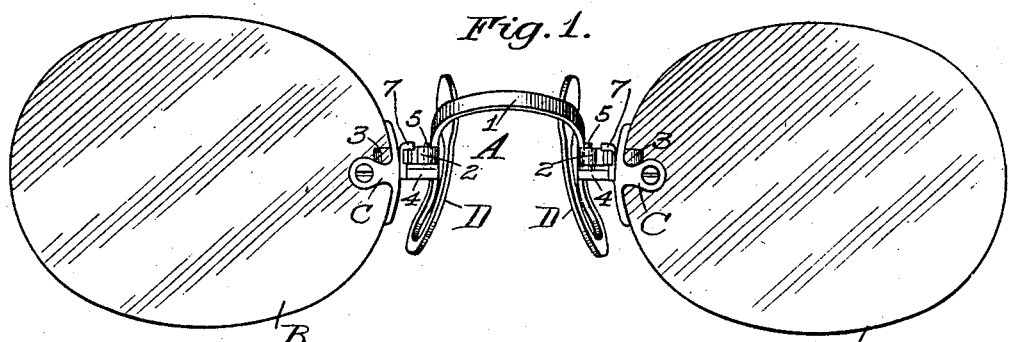
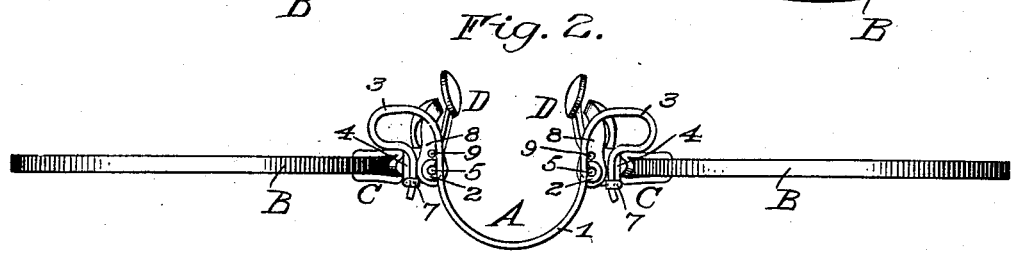
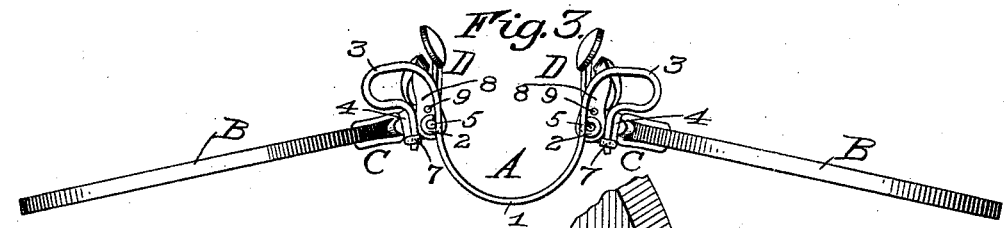
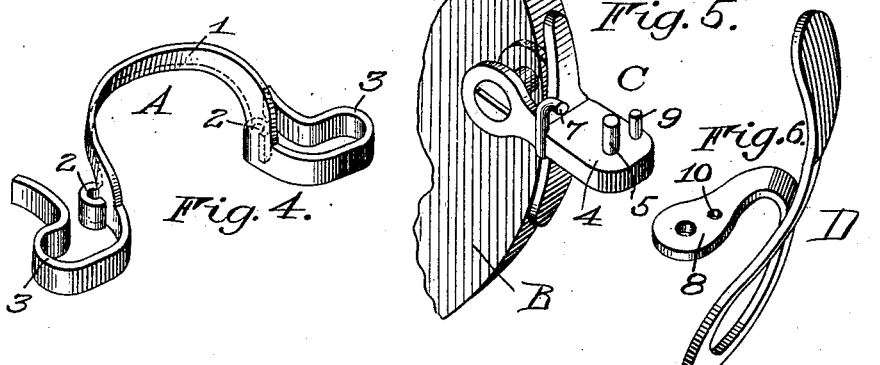
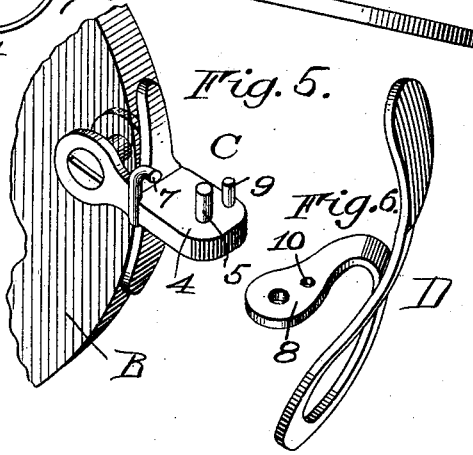
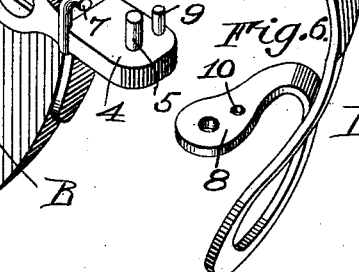
Witnesses
Walter B. Payne
H. H. Simms
Inventor
Leo F. Adt.
By Munch & Rich
his Attorneys
THE NORRIS PETERS CO., WASHINGTON, D. C.

UNITED STATES PATENT OFFICE.

LEO F. ADT, OF ALBANY, NEW YORK.

EYEGLASSES.

977,151.   Specification of Letters Patent.   Patented Nov. 29, 1910.

Application filed May 3, 1907. Serial No. 371,747.

*To all whom it may concern:*

Be it known that I, LEO F. ADT, of Albany, in the county of Albany and State of New York, have invented new and useful Improvements in Eyeglasses; and I do hereby declare the following to be a full, clear, and exact description of the same, reference being had to the accompanying drawings, forming a part of the specification, and to the reference-numerals marked thereon.

This invention relates to eyeglasses and particularly to that type in which the lenses move substantially in the plane of their optical axes for the purpose of controlling the nose guards; an object of the present invention being to provide a mounting in which the springs, which position the nose guards, also serve for retaining the lens-attaching members and the bridge in coöperative relation.

To these and other ends the invention consists in certain improvements and combinations of parts as will be hereinafter more fully described, the novel features being pointed out in the claims at the end of the specification In the drawings: Figure 1 is a front view of the eyeglasses. Fig. 2 is a top view with the lenses in normal position. Fig. 3 is a like view showing the manner in which the nose guards separate upon the forward movement of the lenses. Fig. 4 is a perspective view of the bridge. Fig. 5 is a detail perspective view showing a lens-attaching member. Fig. 6 is a perspective view of the nose guard.

With more particular reference to the drawings, A indicates the bridge, B the lenses, C the lens-attaching members and D the nose guards.

The bridge A is preferably made from flat stock and comprises an arched nose-bridging portion 1; vertical bearing-portions 2 located near each end of the nose bridging portion, and each formed by rolling a forwardly extending lip on the flat stock into a sleeve; and spring portions 3 preferably formed from rearwardly-extending arms at the ends of the bridging portion, by bending the stock of each arm widthwise and horizontally, first outwardly in the rear of the adjacent lens, then inwardly to form a loop in the rear of the adjacent lens, and finally forwardly to provide an arm extending to a point beyond the adjacent vertical bearing.

The lens-attaching members C are secured to the lenses B in any suitable manner and each is provided with a horizontal ear 4 which carries a vertical pin 5 arranged substantially in the plane of the lens and fitting in one of the vertical bearings 2 on the bridge. When the bridge is connected to a lens-attaching member, one of the spring portions 3 thereof slidingly engages with a swinging part of the eyeglasses, for example, with the adjacent lens-attaching member, to retain the latter and the bridge in coöperative relation. The pins 5 with the sleeves 2 being in the form of open bearings provide pivotal and detachable connections between the lenses and the bridge; and to prevent accidental disconnection of these parts, the springs 3 which effect the turning of the lenses, are employed for holding the parts together; the lens-attaching members for this purpose having means, as for instance, overhanging shoulders 7, with which the free ends of the adjacent spring arms 3 are adapted to engage to hold the parts together, and from under which the said arms are adapted to be moved to permit the adjacent lens-attaching member to be separated from the bridge.

The nose guards D may be of any suitable construction and may be connected to the mounting in any desired manner. However, it is preferred, to secure the nose guards to the mounting by the same springs 3 that connect the bridge and the lens-attaching members and, therefore, a horizontal portion 8 on each nose guard is fitted over a bearing pin 5 and is held against turning thereon by a suitable means as by a projection 9 which enters an opening 10 in the horizontal portion of the nose guard, the nose guard thereby being clamped between the adjacent lens-attaching member and the bridge. These projections 9 extend above the nose guards so that they may engage the bridge in the rear of the pivotal connections and thus act as stops to limit the rearward movement of the lenses.

To remove or position the eyeglasses the lenses are moved in the plane of their optical axes by grasping them at their outer edges and turning them relatively to the bridge, thus effecting the movement of the guards relatively to each other.

The springs 3 for effecting the interlocking connection between the parts and for turning the lenses are shown as forming parts of the bridge, as this is my presently preferred construction, nevertheless, I am aware that the springs 3 can be mounted in other ways and I therefore do not wish to be limited to the arrangement herein shown.

Having thus described my invention, what I claim is:

1. In an eyeglass mounting, the combination with a bridge and a lens attaching member, of coöperating bearing members permanently carried by the lens attaching member and the bridge and detachably and pivotally connecting said parts, a spring rigidly secured at one end to one of said parts out of contact with the bearing members to position the lens attaching member, and coöperating portions on the spring and the other part of the mounting for retaining the bearing members in engagement.

2. In an eyeglass mounting, the combination with a bridge, and a lens attaching member, of bearing members permanently carried by the lens attaching member and the bridge and detachably engaging each other, a spring for turning the lens attaching member, carried by the bridge, out of contact with the bearing members, and coöperating portions on the spring and the lens attaching member retaining the bearing members in engagement.

3. In an eyeglass mounting, the combination with a bridge having a bearing thereon, of a lens attaching member having a bearing member detachably coöperating with the bearing member on the bridge, a nose guard mounted also to swing relatively on the bridge and detachably engaging one of said bearing members, a spring for turning the lens attaching member and the nose guard relatively to the bridge, and coöperating portions on the spring and a portion of the mounting acting to retain the bearing members in engagement.

4. In an eyeglass mounting, the combination with a bridge and a lens attaching member, of a pivot pin permanently carried by one of said parts, a bearing on the other part detachably engaging the pivot pin, a spring rigidly secured at one end to one of said parts to position the lens attaching member, and coöperating portions on the spring and the other part of the mounting for retaining the bearing in engagement with the pivot pin.

5. In an eyeglass mounting, the combination of a bridge having spring arms, and lens-attaching members mounted to swing relatively to the bridge, held in normal positions by the spring arms and carrying means to engage the spring arms near their free ends to hold the parts in coöperative relation.

6. In an eyeglass mounting, the combination of a lens-attaching member having a vertical pivot pin extending therefrom, a bridge having a bearing fitted on the extending portion of said pin, a nose guard also fitted on the extending portion of the pin between the bridge and the lens-attaching member, a spring for returning the lens-attaching member to normal position, and coöperating portions on the spring and another part of the mounting for retaining the bearing on the bridge and on the lens-attaching member in engagement.

7. In an eyeglass mounting, the combination with a lens-attaching member, and a nose guard rigidly secured thereto, of a bridge having a spring arm connected with the lens-attaching member for returning the latter to normal position.

8. In an eyeglass mounting, the combination of a lens-attaching member having a shoulder, and a bridge to which the lens-attaching member is pivoted, having a spring arm adapted to engage below the shoulder to return the lens-attaching member to normal position and to hold the latter in coöperative relation with the bridge.

9. In an eyeglass mounting, the combination of a bridge formed of flat stock and having rolled lips forming vertical bearing sleeves, and lens-attaching members having bearing members for coöperation with the bearing sleeves.

10. In an eyeglass mounting, the combination with a pair of lenses, of a bridge on which the lenses are pivoted to swing in a substantially horizontal plane, having springs beyond the pivots coöperating with the lenses to turn them on their pivots and formed with loops deflected outwardly behind the lenses.

11. An eyeglass mounting formed of flat stock and comprising an arched bridging portion, forwardly extending spring arms formed by widthwise bends in the stock, and vertical bearings located between the forwardly extending arms and the bridging portions.

LEO F. ADT.

Witnesses:
H. H. SIMMS,
FLORENCE E. FRANCK.